(12) United States Patent
Satta et al.

(10) Patent No.: US 8,780,900 B2
(45) Date of Patent: Jul. 15, 2014

(54) CROSSBAR SWITCH SYSTEM

(75) Inventors: Seiji Satta, Kawasaki (JP); Akira Okamoto, Kawasaki (JP); Takayuki Kinoshita, Kawasaki (JP); Makoto Hataida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 885 days.

(21) Appl. No.: 12/926,032

(22) Filed: Oct. 21, 2010

(65) Prior Publication Data

US 2011/0038374 A1 Feb. 17, 2011

Related U.S. Application Data

(63) Continuation of application No. PCT/JP2008/059917, filed on May 29, 2008.

(51) Int. Cl.
*H04L 12/28* (2006.01)

(52) U.S. Cl.
USPC .......................... 370/389; 370/428; 709/242

(58) Field of Classification Search
None
See application file for complete search history.

(56) References Cited

U.S. PATENT DOCUMENTS

| 7,079,525 | B1 * | 7/2006 | Goldstein et al. | 370/352 |
|---|---|---|---|---|
| 2001/0025359 | A1 * | 9/2001 | Tanaka | 714/753 |
| 2006/0039370 | A1 * | 2/2006 | Rosen et al. | 370/389 |

FOREIGN PATENT DOCUMENTS

| JP | 09-200878 | 7/1997 |
|---|---|---|
| JP | 11-355276 | 12/1999 |
| JP | 2003-324478 | 11/2003 |

OTHER PUBLICATIONS

International Search Report for PCT/JP2008/059917, mailed Jul. 15, 2008.

* cited by examiner

*Primary Examiner* — Khoa Huynh
(74) *Attorney, Agent, or Firm* — Staas & Halsey LLP (57) ABSTRACT

Each chip arranged in each crossbar switch creates and issues, if a packet is input, a log collection packet for collecting a log of the packet. Each chip collects a log related to a transfer of the input packet. Each chip embeds, in the issued log collection packet or a log collection packet transferred from a crossbar switch in a previous stage, the collected log. If a transfer destination of the packet is other than the crossbar switches, each chip stores, in a storage space, the log embedded in the log collection packet and then transfers, to the transfer destination, only an original packet in which the log is deleted. In contrast, if the transfer destination is a crossbar switch, each chip transfers the log collection packet to a crossbar switch in a next stage.

5 Claims, 8 Drawing Sheets

CROSSBAR SWITCH SYSTEM

CROSS-REFERENCE TO RELATED APPLICATIONS

This application is a continuation of International Application No. PCT/JP2008/059917, filed on May 29, 2008, the entire contents of which are incorporated herein by reference.

FIELD

The embodiments discussed herein are directed to a crossbar switch system.

BACKGROUND

In recent years, large scale computer systems having multistage crossbar switches have been introduced. The crossbar switches mentioned here form, in a dynamic manner, paths that connect, one to one, each unit, such as a central processing unit, a memory unit, and an input-output device, that is installed in a computer. Packets that are transmitted/received between each unit are transferred, using paths formed by the multistage crossbar switches, between the crossbar switches.

Figure 10:
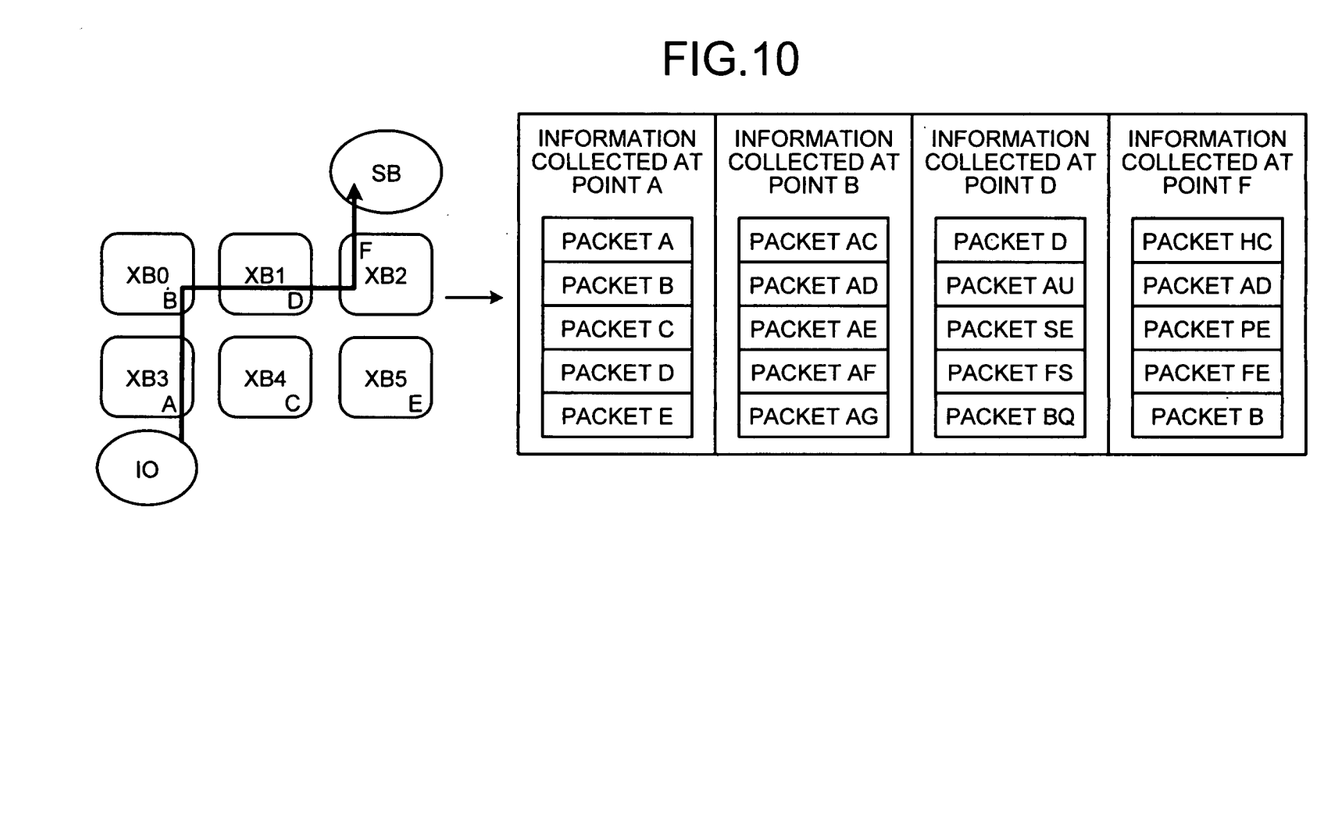
FIG. 10 is a schematic diagram explaining a conventional technology.

As illustrated in FIG. 10, chips included in crossbar switches each store, in storage spaces (i.e., history, random access memory (RAM), or the like), historical information (hereinafter, referred to as a "log"). Accordingly, when a system operator checks the performance or the design validity of a crossbar switch system, the historical information is collected for each chip and analyzed. The arrow illustrated in FIG. 10 indicates an example of a path taken when a packet is sent from an "I/O (i.e., Input/Output or input-output device)" to an "SB (i.e., system board, central processing unit, or the like)". As illustrated in FIG. 10, the log information on the packet is collected for each chip, such as information collected at point A, information collected at point B, information collected at point D, and information collected at point F. In FIG. 10, letters of the alphabet after the "packet" do not indicate a collection location but indicate that the information collected for each chip is fragmentary information of various kinds.

Japanese Laid-open Patent Publication No. 2003-324478 discloses a technology for collecting, in a system that includes multiple information processing apparatuses, log information on the information processing apparatuses for each information processing apparatus. Furthermore, Japanese Laid-open Patent Publication No. 11-355276 discloses a technology in which, in a system in which multiple computers are connected via a network, diagnostic packets containing path-route information are created and sent to the network.

However, with the conventional technologies, there is a problem in that it is difficult to analyze packets that are forwarded between the crossbar switches. In other words, because the log information collected for each chip cannot be anything but fragmented, it is difficult to analyze packets by focusing on the behavior of the packets that are forwarded between the crossbar switches. Furthermore, in a large scale system that includes multistage crossbar switches, it is difficult to check the performance or design validity of the entire system only by using performance information or event information that is collected for each chip. Furthermore, the technologies disclosed in the above-described Japanese Laid-open Patent Publication No. 2003-324478 and Japanese Laid-open Patent Publication No. 11-355276 cannot solve the above problem.

SUMMARY

According to an aspect of an embodiment of the invention, a crossbar switch system includes crossbar switches, arranged in multiple stages, that form paths that connect each unit in a computer. Each of the crossbar switches includes an issuing unit that creates and issues, when a packet is input, a history collection packet that is used to collect historical information on the packet; a collecting unit that collects historical information related to transferring the input packet; an embedding unit that embeds, in the history collection packet that is issued by the issuing unit or in a history collection packet that is transferred from a crossbar switch in a previous stage, the historical information collected by the collecting unit; a storage space that stores therein historical information; and a transferring unit that transfers, if a transfer destination of a packet is other than the crossbar switches, to the transfer destination, only an original packet in which the historical information is deleted after storing in the storage space the historical information that is embedded in the history collection packet and that transfers, if the transfer destination is a crossbar switch, to a crossbar switch in a next stage, the history collection packet.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiments of the present invention will be explained with reference to accompanying drawings.

In the following, each embodiment will be described as a computer system that includes the crossbar switch system. The computer system mentioned here is, for example, a server device that includes multiple crossbar switches. First, the outline of the computer system in a first embodiment will be described. Then, the configuration of the computer system in the first embodiment, the flow of a process performed by the computer system in the first embodiment, and the advantages of the first embodiment will be described in the order they are listed in this sentence. Subsequently, another embodiment will be described.

[a] First Embodiment

Outline of the Computer System in First Embodiment

Figure 1:
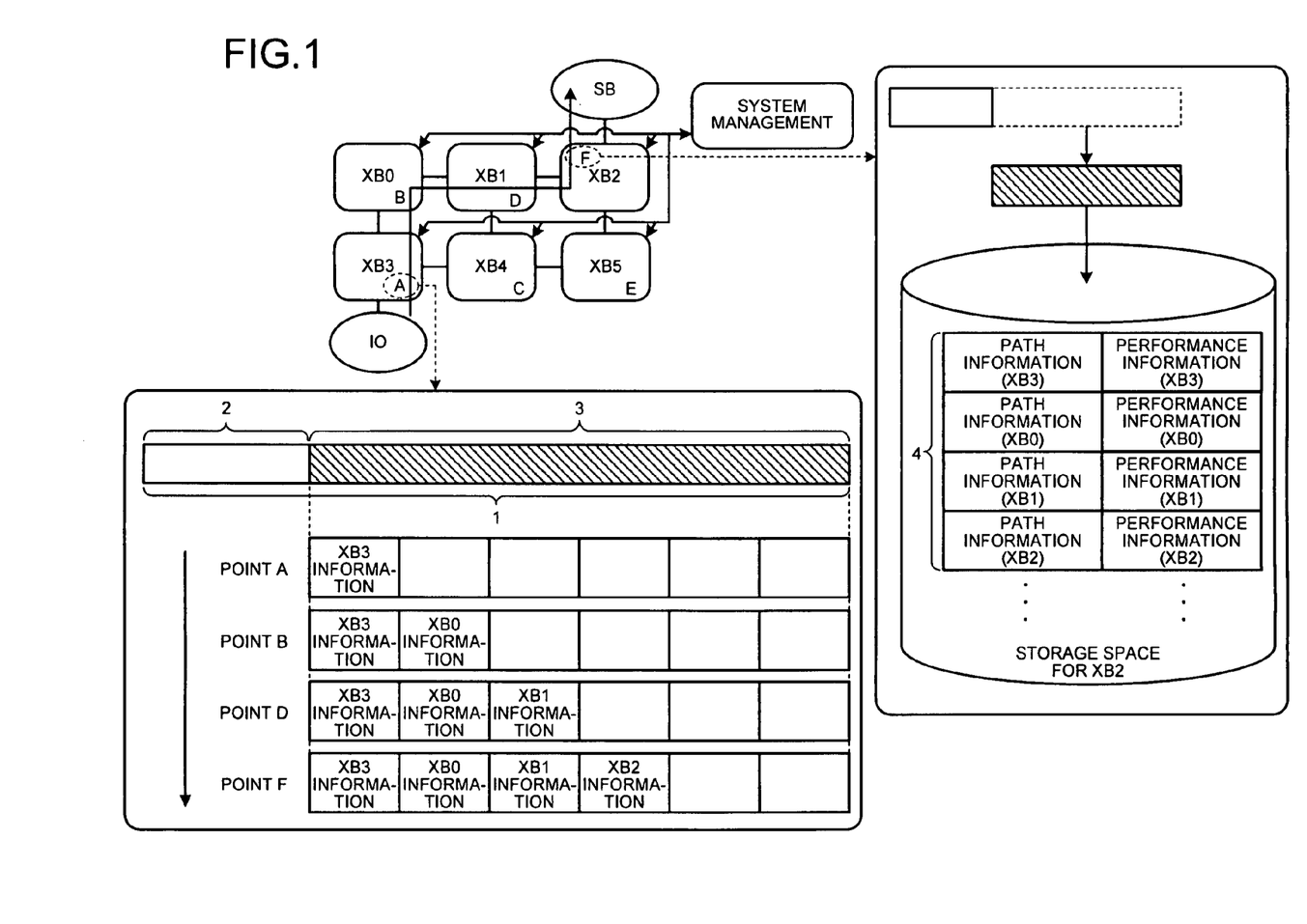
FIG. 1 is a schematic diagram explaining the outline of a computer system in a first embodiment.

First, the outline of the computer system in the first embodiment will be described with reference to FIG. 1. FIG. 1 is a schematic diagram explaining the outline of the computer system in a first embodiment. Furthermore, FIG. 1 illustrates the format of log collection packets that are forwarded between the crossbar switches and also illustrates log information stored by the crossbar switches.

The computer system illustrated in FIG. 1 includes six crossbar switches, i.e., cross bar switches "XB0" to "XB5". Furthermore, the computer system illustrated in FIG. 1 further includes an input-output device control unit (hereinafter, referred to as an "I/O") to which a system board (hereinafter, referred to as a "SB") or an input-output device/input-output device is connected. Components, such as the system board or the I/O illustrated in FIG. 1 are connected to any one of the crossbar switches. A packet transfer performed in the SB or the SB and the I/O is performed via the XBs. For example, when a packet is sent from the "I/O" to the "SB", or example, each of the crossbar switches, i.e., the "XB3", the "XB0", the "XB1", and the "XB2", forms, in a dynamic manner, a path that connects, one to one, the "I/O" and the "SB". The letters "A" to "F" indicated on each crossbar switch illustrated in FIG. 1 are for convenience of explaining the passing points of predetermined crossbar switches through which the dynamically formed paths pass. In other words, by using the path formed by the "XB3", the "XB0", the "XB1", and the "XB2", the packet is forwarded by sequentially passing through a point "A", a point "B", a point "D", and a point "F".

Each of the crossbar switches in the first embodiment has a chip mounted on it. The chip mounted on each crossbar switch has a function of collecting a log of a packet to be transferred. For example, if the chip included in the crossbar switch "XB3" receives a packet from the "I/O", the chip issues a log collection packet that is used to collect logs of the received packet. Specifically, as illustrated in FIG. 1, the chip in the crossbar switch "XB3" changes the format of the packet received from the "I/O" and issues a log collection packet 1. In other words, in addition to a normal system using area 2 that is included in a packet received from the "I/O", the chip in the crossbar switch "XB3" issues the log collection packet 1 by creating, in the packet, a log collection area 3 that collects logs of the packet. In the first embodiment, the log collection area 3 is divided into multiple areas so as to store therein logs collected by the multiple crossbar switches. For example, the log collection area 3 illustrated in FIG. 1 is divided into six areas.

Then, the chip in the crossbar switch "XB3" embeds, in the issued log collection packet 1, a log to be collected. For example, as illustrated at "point A" in FIG. 1, the chip in the crossbar switch "XB3" embeds "XB3 information". The "XB3 information" mentioned here is a log of a packet received from the "I/O" collected by the chip in the "XB3" and is a log to be collected as the log of the packet. In the first embodiment, the log is path information or performance information.

Subsequently, if the transfer destination of the log collection packet 1 in which a log is embedded is a device other than crossbar switches, for example, the "SB", the chip in the crossbar switch "XB3" stores the log embedded in the log collection packet 1 in a storage space, i.e., history, arranged in the chip. Then, the chip in the crossbar switch "XB3" transfers, to the transfer destination, only the packet that is used for log collection, i.e., in the example illustrated in FIG. 1, the original packet that is transferred from the "I/O" that is connected to the "XB3". In contrast, if the transfer destination of the log collection packet 1 is the crossbar switch in the next stage, the chip in the crossbar switch "XB3" transfers, to the crossbar switch that, is the transfer destination, the log collection packet 1 issued by the chip in the crossbar switch "XB3".

For example, as illustrated in FIG. 1, if the transfer destination is the "XB0", the chip in the crossbar switch "XB3" transfers the log collection packet 1 to the crossbar switch "XB0".

If the chip in the crossbar switch "XB0" receives the log collection packet 1 transferred from the crossbar switch "XB3", the chip in the crossbar switch "XB0" embeds, in the log collection packet 1, a log that is collected by the chip in the crossbar switch "XB0". For example, as illustrated at a "point B" in FIG. 1, the chip in the crossbar switch "XB0" embeds "XB0 information". At this stage, as illustrated in FIG. 1, the "XB3 information" and the "XB0 information" are embedded in the log collection packet 1, in an accumulative manner, as the log collection packet 1 passing through the crossbar switches "XB3" and "XB0".

Then, the chip in the crossbar switch "XB0" transfers the log collection packet 1 to the crossbar switch "XB1" in the next stage. As illustrated at a "point D" in FIG. 1, similarly, the chip in the crossbar switch "XB1" embeds "XB1 information" and then transfers the log collection packet 1 to the crossbar switch "XB2".

As illustrated at a "point F" in FIG. 1, similarly, the chip in the crossbar switch "XB2" embeds "XB2 information". In this way, as illustrated in FIG. 1, the "XB3 information", the "XB0 information", the "XB1 information", and the "XB2 information" are embedded in the log collection packet 1, in an accumulative manner, as the log collection packet 1 passing through the crossbar switches crossbar switch "XB3", "XB0", "XB1", and "XB2".

Then, the chip in the crossbar switch "XB2" determines the transfer destination of the log collection packet 1. In the example illustrated in FIG. 1, the transfer destination of the log collection packet 1 is the "SB" that is other than the crossbar switches. Accordingly, the chip in the crossbar switch "XB2", first, stores the logs embedded in the log collection packet 1 in a storage space and then transfers, to the "SB" that is the transfer destination, only the original packet that is used for log collection.

Specifically, as illustrated in FIG. 1, the chip in the crossbar switch "XB2" stores, in the storage space, log information 4 that is accumulatively embedded in the log collection packet 1. The log information 4 mentioned here is the "XB3 information", the "XB0 information", the "XB1 information", and the "XB2 information", each of which is information that includes path information and performance information. The chip of the crossbar switch "XB2" stores, in the storage space and for each packet, the log information 4 collected by the log collection packet 1. In this way, because the log information collected for each chip is stored in packet units, instead of being fragmented, the log information is compiled for each path through which a packet passes.

Then, the chip of the crossbar switch "XB2" restores the format of the packet by discarding the log information collection area 3 in the log collection packet 1. The chip of the crossbar switch "XB2" transfers, to the "SB" that is the transfer destination, the packet in which the log information collection area 3 has been discarded.

Thereafter, a system management, which is an external device and manages the crossbar switch system, collects the logs that are stored in the storage space of the crossbar switch "XB2", and then an analysis system or a person analyzes the logs. At this time, because the log information is information in packet units, when analyzing the packet that is transferred between the crossbar switches, it is possible to easily analyze the packet by focusing on the behavior of the packet.

Configuration of the Computer System in First Embodiment

Figure 2:
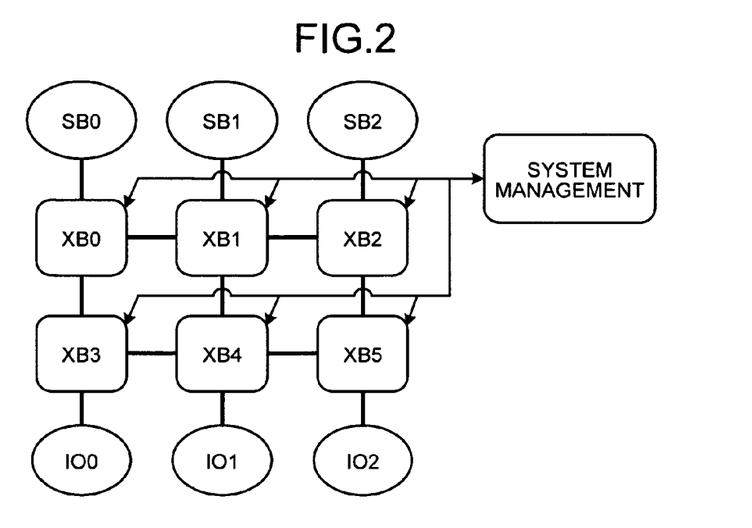
FIG. 2 is a schematic diagram explaining the configuration of the computer system in the first embodiment.
Figure 3:
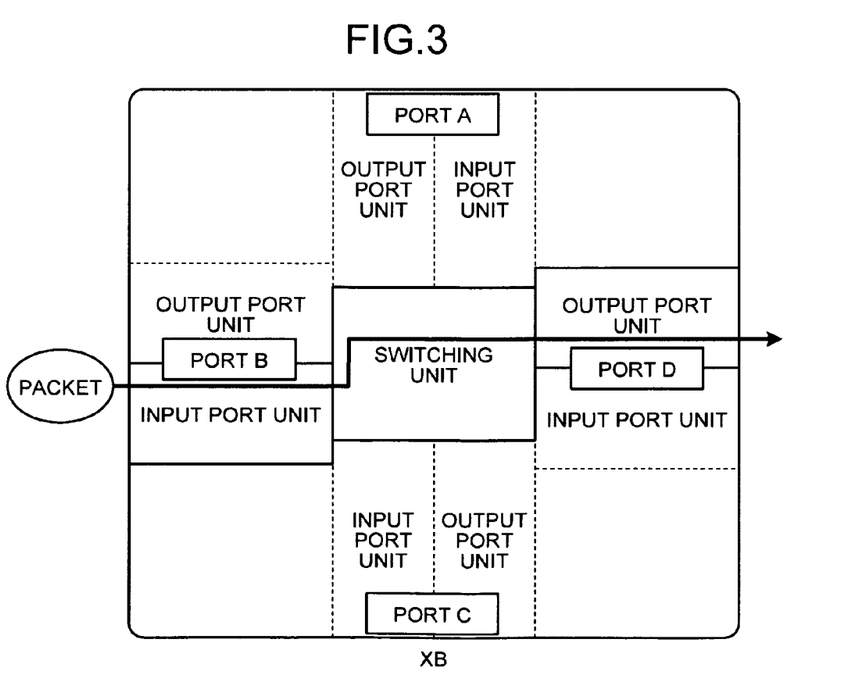
FIG. 3 is a functional block diagram explaining the configuration of a crossbar switch in the first embodiment.
Figure 4:
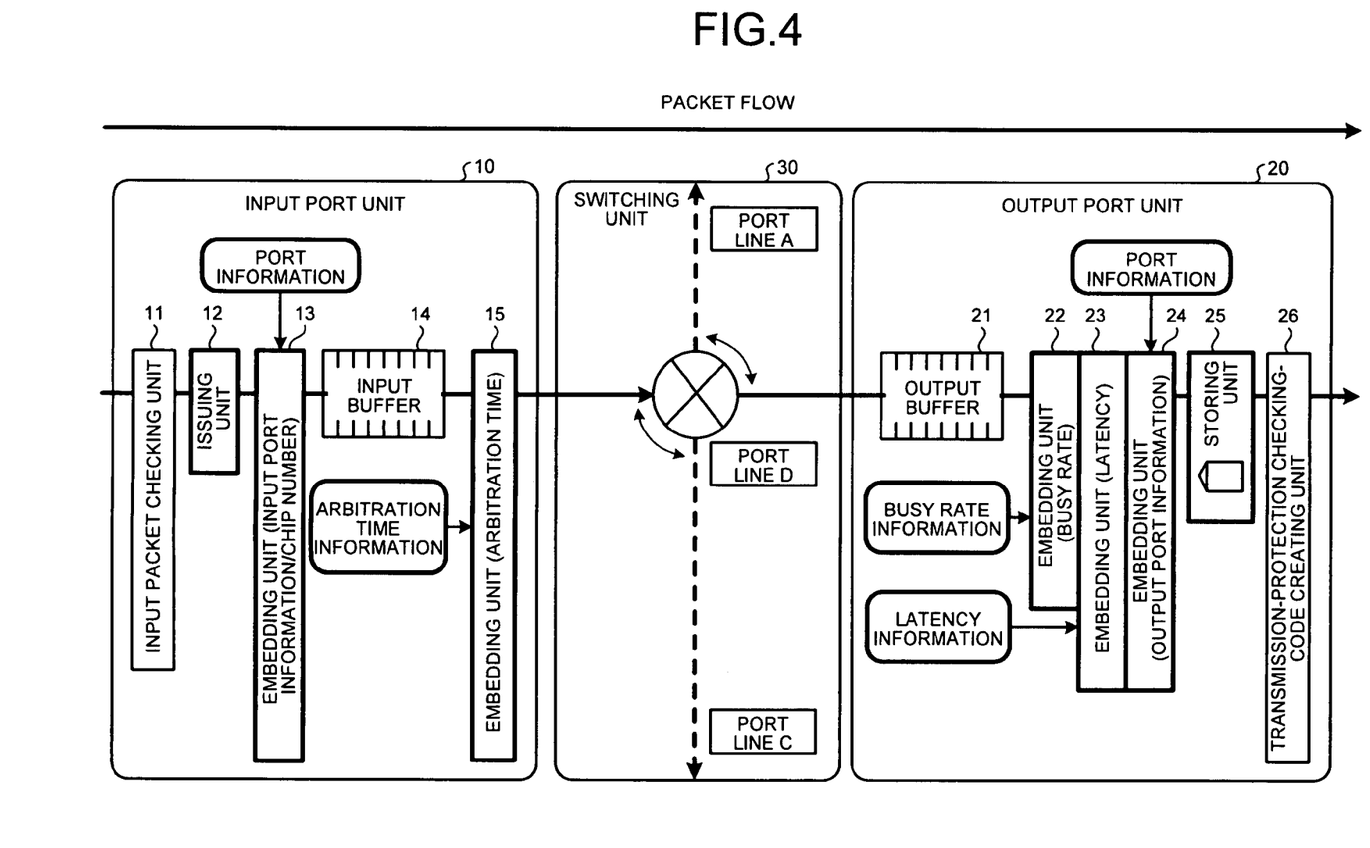
FIG. 4 is a block diagram illustrating the configuration of the crossbar switch in the first embodiment.
Figure 5:
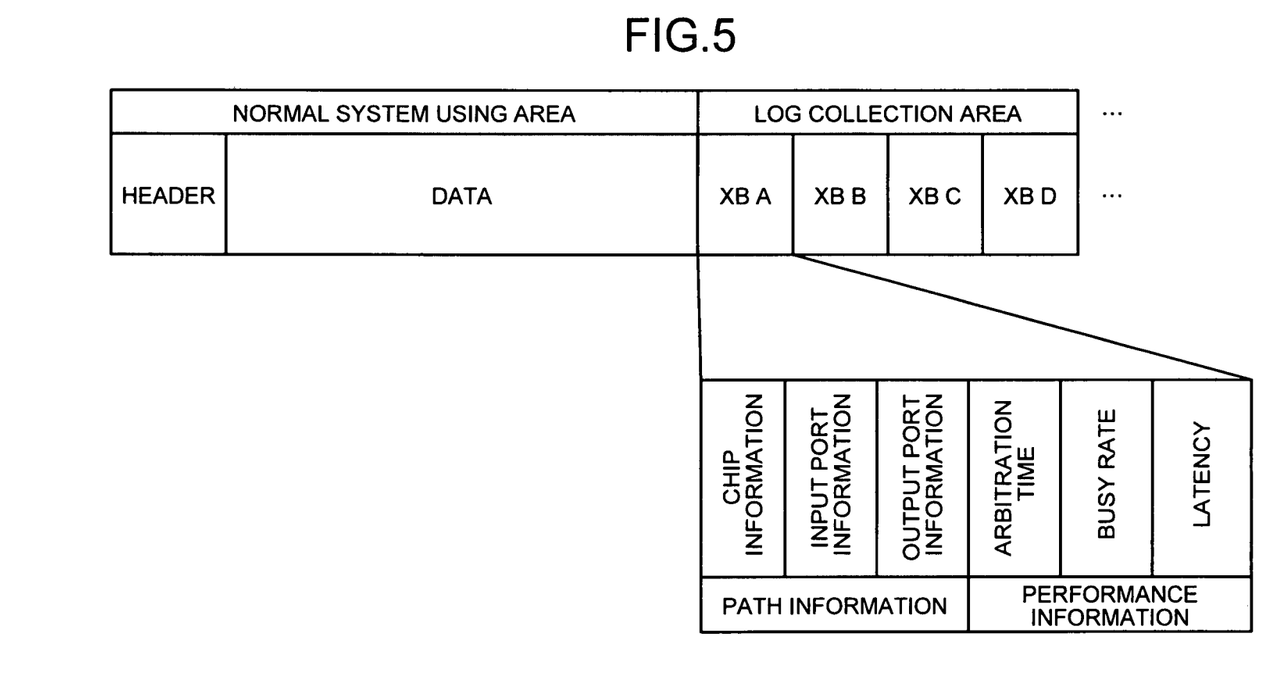
FIG. 5 is a schematic diagram explaining the format of a packet.

In the following, the configuration of the computer system in the first embodiment will be described with reference to FIGS. 2 to 5. FIG. 2 is a schematic diagram explaining the configuration of the computer system in the first embodiment. FIG. 3 is a functional block diagram explaining the configuration of a crossbar switch in the first embodiment. FIG. 4 is a block diagram illustrating the configuration of the crossbar switch in the first embodiment. FIG. 5 is a schematic diagram explaining the format of a packet.

The computer system in the first embodiment has a configuration like that illustrated in FIG. 2. Specifically, the computer system in the first embodiment includes six crossbar switches "XB0" to "XB5". Furthermore, the crossbar switches "XB0" to "XB2" are connected to system boards "SB0" to "SB2", respectively. Furthermore, the crossbar switches "XB3" to "XB5" are connected to input-output devices "I/O0" to "I/O2", respectively.

Furthermore, as illustrated in FIG. 2, chips included in the crossbar switches "XB0" to "XB5" are connected to the system management that manages a crossbar system.

Here, a single crossbar switch has a configuration like that illustrated in FIG. 3. In the example illustrated in FIG. 3, the crossbar switch has four ports (four-port XB): a "port A", a "port B", a "port C", and a "port D". Each of the ports in the crossbar switch includes an input port unit and an output port unit. As illustrated in FIG. 3, for example, if a packet is input from the "port B" and is output from the "port D", the packet passes the input port unit of the "port B" to the output port unit of the "port D" via the switching unit.

FIG. 4 is a block diagram illustrating, by focusing on the flow of such a packet, the function and configuration of a single crossbar switch. In FIG. 4, a single unit of an input port unit 10, a switching unit 30, and an output port unit 20 are illustrated for convenience of explanation. However, in practice, an input port unit and an output port unit are arranged, for each port, in a crossbar switch. In the following, the input port unit 10, the output port unit 20, and the switching unit 30 will be described in the order they are listed in this sentence.

The input port unit 10 is a unit that receives a packet that is input from outside the crossbar switch. The input port unit 10 usually has a buffer in order to alleviative the effect of degradation of performance due to transmission delay between chips. Furthermore, the input port unit 10 checks whether an error is present in the packet that is input to the crossbar switch, i.e., whether the packet is corrupted. Specifically, as illustrated in FIG. 4, the input port unit 10 includes an input packet checking unit 11, an issuing unit 12, an embedding unit (input port information/chip No.) 13, an input buffer 14, and an embedding unit (arbitration time) 15. In the first embodiment, a case will be described in which the input port unit 10 includes the embedding unit 15; however, the present invention is not limited thereto. If there is another log to be embedded in the input port unit 10, the input port unit 10 further includes an embedding unit that embeds that log.

The input packet checking unit 11 checks a packet that is input to a crossbar switch. Specifically, if the input packet checking unit 11 receives an input of the packet, the input packet checking unit 11 checks whether an error is present in the packet. Furthermore, the input packet checking unit 11 sends the checked packet to the issuing unit 12.

The issuing unit 12 issues a log collection packet that is used to collect logs of the packet. Specifically, if the issuing unit 12 receives a packet from the input packet checking unit 11, the issuing unit 12 issues a log collection packet that is used to collect logs of the packet and sends the issued log collection packet to the embedding unit 13. The log collection packet has a configuration in which a log collection area is added to the packet that is received via the input packet checking unit 11. Furthermore, the issuing unit 12 in the first embodiment starts issuing the log collection packet in accordance with an issue instruction received from the system management that controls the chips in the crossbar switches on an upper level. Furthermore, the issuing unit 12 in the first embodiment determines whether the received packet agrees with the issue condition that is set in advance. If the issuing unit 12 determines that the packet agrees with the issue condition, the issuing unit 12 issues a log collection packet.

At this time, the issuing unit 12 in the first embodiment changes the format of the received packet. By creating, in the packet in which the format is changed, a log collection area for collecting the logs of the packet, the issuing unit 12 issues the log collection packet. For example, the issuing unit 12 in the first embodiment issues the log collection packet like that illustrated in FIG. 5. In the example illustrated in FIG. 5, the area indicated by the "normal system using area" is an area held by a normal packet. The "normal system using area" includes a "Header" area and a "Data" area.

In contrast, the area indicated by the "log collection area" is an area that is additionally created by the issuing unit 12 and is added to the received packet. The log collection area is divided into multiple areas so as to store therein each of the logs collected by multiple crossbar switches. In the example illustrated in FIG. 5, the "log collection area" associated with a certain crossbar switch is divided into areas of "path information" and "performance information". Furthermore, the log collection area illustrated in FIG. 5 is divided into four areas: "XB A" to "XB D". These divided areas indicate the crossbar switches through which a packet passes and indicate areas in which logs are sequentially stored in the "XB A", the "XB B", the "XB C", and the "XB D" in the order they appear in this sentence. As illustrated in FIG. 1, the log collection area is not necessarily defined for each crossbar switch. In other words, logs can be sequentially stored in the divided area in the order of the crossbar switches through which the packet passes. This is effective from the viewpoint of ease of the design or simplicity of the order. Furthermore, the number of divisions of the log collection area mentioned above is only an example.

The path information is an area in which log information related to a transfer path for a packet is stored. Areas of "chip information", "input port information", and "output port information", are set in the "path information". The "chip information" is information that identifies the chip in the crossbar switch through which the packet passes. The "input port information" is information that identifies the input port unit 10 into which the packet is input. The "output port information" is information that identifies the output port unit 20 from which the packet is output.

In contrast, the performance information is an area in which information related to the performance or operation of the crossbar switch at the time of packet transfer is stored.

Areas of "arbitration time", "busy rate", and "latency", are set in the "performance information". The "arbitration time" is information that indicates the waiting time for a transfer due to mediation being received from the switching unit 30 because of a destination conflict, which occurs when the input port unit 10 holds a packet, with another packet that is input from another input port unit 10, or the "arbitration time" is information that indicates the number of times the packet has been lost due to the conflict. The "busy rate" is the rate obtained by dividing the waiting time for a packet in the output port unit 20 for a transfer, due to a state in which a chip to which the packet is to be output cannot receive the packet, by a fixed time. The "latency" mentioned here is a period of time (in clock units) from when a packet is input to a chip in a crossbar switch to when the packet is output.

Although not illustrated in FIG. 5, by using a free area in a "Header" in the "normal system using area" or holding a redundant bit with respect to the "log collection area", an area that stores therein a flag that identifies whether logs are collected in a packet is arranged. The flag is used for a process performed by a storing unit 25 and all of the embedding units in the input port unit 10 and the output port unit 20.

The embedding unit 13 collects logs and embeds the logs in the log collection packet. Specifically, if the embedding unit 13 illustrated in FIG. 4 receives a log collection packet from the issuing unit 12, the embedding unit 13 collects input port information on the embedding unit 13 that is stored in advance and collects chip information. Subsequently, the embedding unit 13 embeds, in the log collection area in the log collection packet received from the issuing unit 12, the collected input port information and chip information and sends the embedded log collection packet to the input buffer 14. Furthermore, when the embedding unit 13 embeds the input port information and the chip information in the log collection packet, the embedding unit 13 stores, in the log collection packet, a flag that identifies whether logs are collected.

The input buffer 14 temporarily stores therein the log collection packet that is output from the embedding unit 13. Specifically, if the input buffer 14 receives a packet from the embedding unit 13, the input buffer 14 temporarily stores therein the packet and sends, at an appropriate time, the stored packet to the embedding unit 15.

The embedding unit 15 collects logs and embeds the logs in the log collection packet. Specifically, if the embedding unit 15 receives the log collection packet from the input buffer 14, the embedding unit 15 collects arbitration time information. Subsequently, the embedding unit 15 embeds, in the log collection area in the log collection packet received from the input buffer 14, the collected arbitration time information and sends the embedded log collection packet to the switching unit 30.

The output port unit 20 is a unit that receives the packet from the switching unit 30. In a similar manner as in the input port unit 10, the output port unit 20 has a buffer. Furthermore, the output port unit 20 creates a transmission-protection checking code, such as an error correcting code (ECC), and adds it to a packet to be output. Specifically, as illustrated in FIG. 4, the output port unit 20 includes an output buffer 21, an embedding unit (busy rate) 22, an embedding unit (latency) 23, an embedding unit (output port information) 24, the storing unit 25, and a transmission-protection checking-code creating unit 26. In the first embodiment, a case in which the output port unit 20 includes the embedding unit 22, the embedding unit 23, and the embedding unit 24 is described as an example; however, the present invention is not limited thereto. If there is another log to be embedded in the output port unit 20, the output port unit 20 further includes an embedding unit that embeds that log.

The switching unit 30 is a unit that switches paths for a packet in accordance with the header information in the packet received from the input port unit 10. Port units that are arranged in the crossbar switch, i.e., the input port unit 10 and the output port unit 20, are connected to the switching unit 30. The switching unit 30 usually has a function of mediating between packets when packets received from each of the input port units 10 conflict.

The output buffer 21 temporarily stores therein a packet. Specifically, if the output buffer 21 receives a packet from the switching unit 30, the output buffer 21 temporarily stores therein the packet and sends, at an appropriate time, the stored packet to the embedding unit 22.

The embedding unit 22 collects logs and embeds the logs in the packet received from the output buffer 21. Specifically, if the embedding unit 22 receives the log collection packet from the output buffer 21, the embedding unit 22 collects busy rate information on the crossbar switch. Subsequently, the embedding unit 22 embeds, in the log collection area in the log collection packet received from the output buffer 21, the collected busy rate information and sends the embedded log collection packet to the embedding unit 23.

The embedding unit 23 collects logs and embeds the logs in the log collection packet received from the embedding unit 22. Specifically, if the embedding unit 23 receives the log collection packet from the embedding unit 22, the embedding unit 23 collects latency information. Subsequently, the embedding unit 23 embeds, in the log collection area in the log collection packet received from the embedding unit 22, the collected latency information and sends the embedded log collection packet to the embedding unit 24.

The embedding unit 24 collects logs and embeds the log in the log collection packet. Specifically, if the embedding unit 24 receives the log collection packet from the embedding unit 23, the embedding unit 24 collects output port information on the embedding unit 24 that is stored in advance. Subsequently, the embedding unit 24 embeds, in the log collection area in the log collection packet received from the embedding unit 23, the collected output port information and sends the embedded log collection packet to the storing unit 25.

The storing unit 25 temporarily stores therein the logs that are output from the embedding unit 24. Specifically, if the storing unit 25 receives the log collection packet from the embedding unit 24, when the transfer destination of the log collection packet is a device, such as a system board, that is other than the crossbar switch, the storing unit 25 checks if there is a flag indicating that the logs are stored. If the flag is a flag indicating that the logs are collected, the storing unit 25 stores the logs embedded in the log collection area. Furthermore, the storing unit 25 transfers, to the transfer destination, only an original packet to which the log collection area has not been added. Specifically, if the transfer destination is a device other than the crossbar switch, the storing unit 25 in the first embodiment discards the "log collection area" from the log collection packet, restores the packet that has only the "normal system using area", and transfers that packet to the transfer destination.

In contrast, if the transfer destination of the log collection packet is a crossbar switch, the storing unit 25 directly transfers the log collection packet to the crossbar switch that is the transfer destination. In the following, determining whether the transfer destination of the log collection packet is a crossbar switch or a device other than the crossbar switch will be described. Each of the chips in the crossbar switches stores, in a storage space in advance, the configuration of the crossbar switch. Specifically, each of the chips stores, in a storage space in advance, which crossbar switch is adjacent to the crossbar switch, which stage of a crossbar switch is set in the computer system, or which component is connected to which crossbar switch. Accordingly, for the packet held by the output port unit 20, the chip in the crossbar switch can determine, in accordance with information stored in advance, whether the transfer destination of the target packet is the crossbar switch or a device other than the crossbar switch.

The transmission-protection checking-code creating unit 26 creates a transmission-protection checking code. Specifically, the transmission-protection checking-code creating unit 26 creates a transmission-protection checking code, adds the transmission-protection checking code to the packet received from the storing unit 25, and outputs the packet outside the crossbar switch.

Flow of a Process Performed by the Computer System in the First Embodiment

Figure 6:
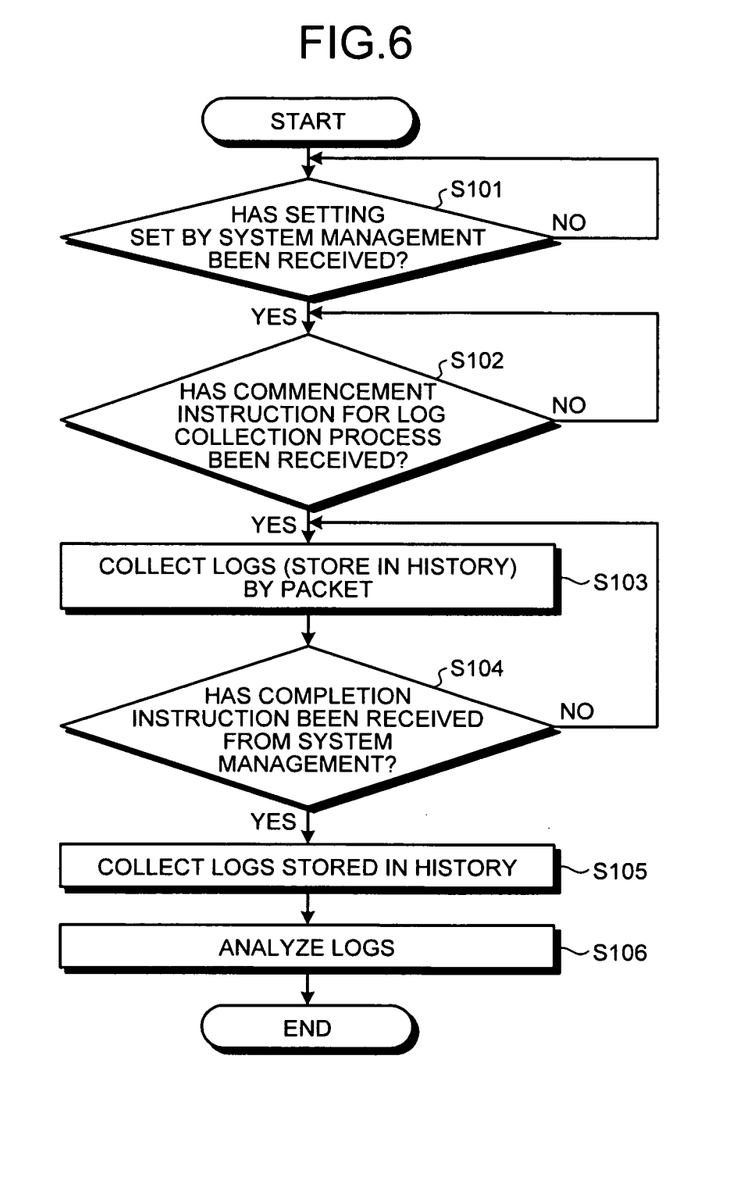
FIG. 6 is a flowchart explaining the flow of the system operation of a computer in the first embodiment.
Figure 7:
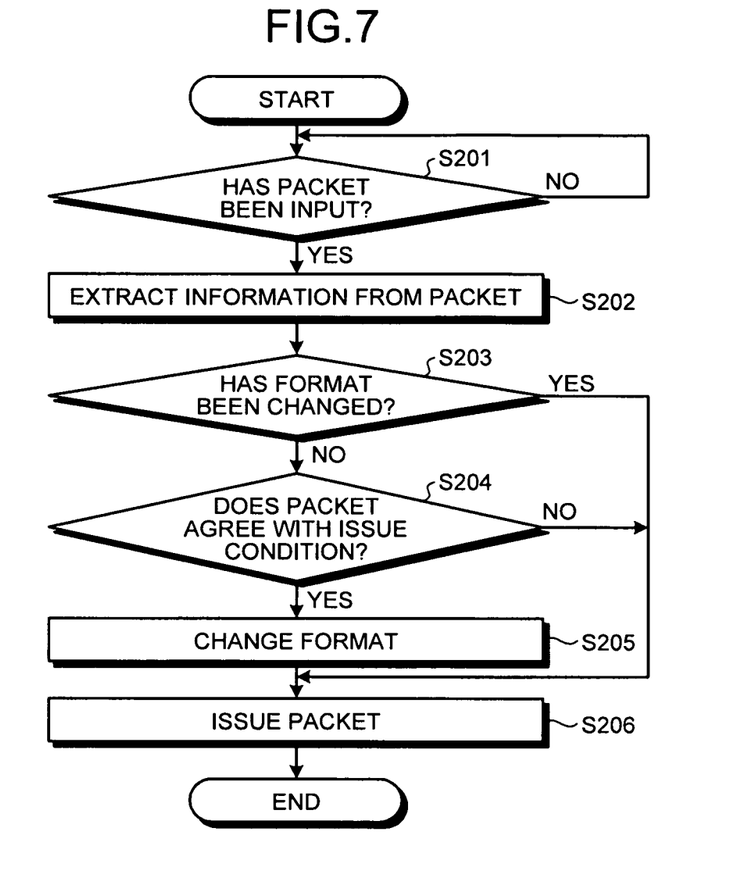
FIG. 7 is a flowchart explaining the flow of a process performed by an issuing unit in the first embodiment.
Figure 8:
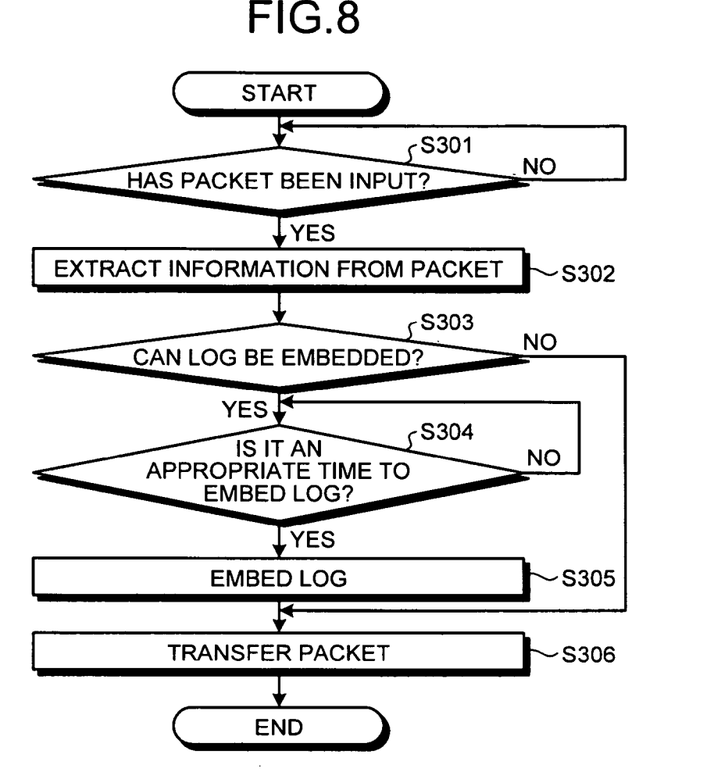
FIG. 8 is a flowchart explaining the flow of an embedding process in the first embodiment.
Figure 9:
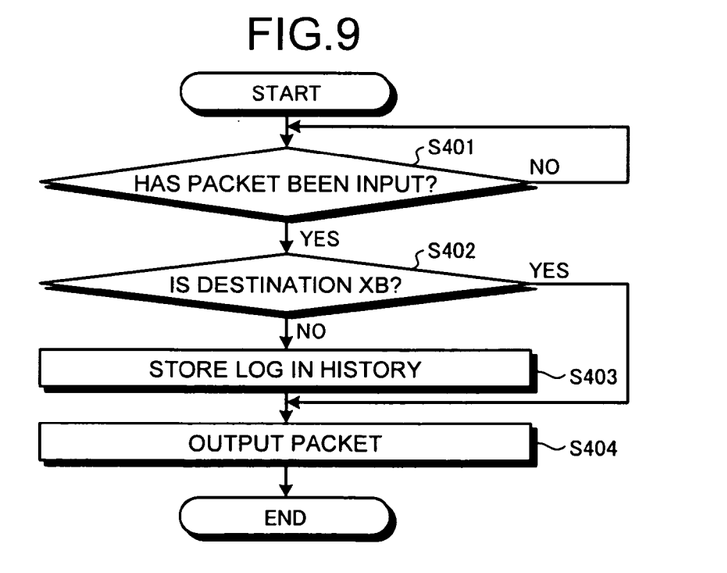
FIG. 9 is a flowchart explaining the flow of a process performed by a storing unit in the first embodiment.

In the following, the flow of a process performed by the computer system in the first embodiment will be described with reference to FIGS. 6 to 9. FIG. 6 is a flowchart explaining the flow of the system operation of a computer in the first embodiment. FIG. 7 is a flowchart explaining the flow of a process performed by the issuing unit in the first embodiment. FIG. 8 is a flowchart explaining the flow of an embedding process in the first embodiment. FIG. 9 is a flowchart explaining the flow of a process performed by the storing unit in the first embodiment.

Flow of the System Operation

First, the flow of the system operation will be described with reference to FIG. 6. If a packet is sent to the computer system, each chip in the crossbar switch determines whether a setting performed by the system management has been received (Step S101). The setting mentioned here is the setting of information necessary for determining the issue condition of the log collection packet or is information on the configuration of the crossbar switch. Specifically, as will be described below, each chip in the crossbar switch in the first embodiment determines whether the input packet agrees with the issue condition and issues, if the input packet agrees with the issue condition, the log collection packet. Accordingly, the system management sets, in each chip in the crossbar switch as information necessary for determining the issue condition, information that identifies which issue condition is used for the determination.

Conceivable issue conditions include, for example, the condition in which the format of all packets that are input is changed every time or the condition in which the format is changed only when the address of the packet corresponds to a predetermined address that is set in advance. Such conditions are effective if a packet to be analyzed is limited to a specified packet. Furthermore, it is also conceivable to use the condition in accordance with the status, for example, in which the format is changed only when the busy rate in the crossbar switch exceeds a certain value. In the first embodiment, the conceived condition is the one in which the format is changed only when the address of the packet corresponds to a predetermined address that is set in advance.

If a chip has not received a setting from the system management (No at Step S101), each chip waits until it has received a setting performed by the system management. In contrast, if each chip has received a setting from the system management (Yes at Step S101), each chip determines whether it has received, from the system management, a commencement instruction for a log collection process (Step S102). If the commencement instruction has not been received (No at Step S102), each chip waits for the commencement instruction.

In contrast, if the commencement instruction has been received (Yes at Step S102), each chip starts the log collection process related to a packet transfer (Step S103). Specifically, in accordance with the reception of the packet, each chip issues a log collection packet or embeds a log in the log collection packet, and then each chip stores the embedded log in a storage space or transfers the log collection packet to another device.

Then, each chip determines whether a completion instruction has been received from the system management (Step S104). If each chip has not received the completion instruction from the system management (No at Step S104), each chip waits for the completion instruction while performing the log collection process.

In contrast, if the completion instruction has been received from the system management (Yes at Step S104), the system management collects logs stored in a history in each chip (Step S105). Specifically, for each of the chip, when a chip becomes the chip in the final stage in accordance with the transfer destination of the packet, that chip stores a log in a history. Accordingly, for each crossbar switch that possibly falls on the final stage, by collecting logs stored in a history in each chip, the system management collects logs for all of the packets targeted for collecting the logs. Furthermore, if the configuration is a case in which only a specific crossbar switch can possibly be the crossbar switch in the final stage, the system management collects logs stored in a history for a chip in a specific crossbar switch. Then, an analysis system or a person analyzes the collected log (Step S106).

Flow of a Process Performed by the Issuing Unit

In the following, the flow of a process performed by the issuing unit 12 will be described with reference to FIG. 7. As illustrated in FIG. 7, first, the issuing unit 12 determines whether the issuing unit 12 has received an input of the packet (Step S201). If the issuing unit 12 has not received an input of the packet (No at Step S201), the issuing unit 12 waits for the input of the packet.

In contrast, if the issuing unit 12 has received an input of the packet (Yes at Step S201), the issuing unit 12 extracts information from the packet (Step S202). Specifically, the issuing unit 12 extracts, from the packet, information that is used to determine, at Step S204 that will be described later, the issue condition of the log collection packet. In the first embodiment, the issue condition is the condition in which the format is changed only when the address of the packet corresponds to a predetermined address. Accordingly, the issuing unit 12 extracts, from the packet, an address as the information that is used to determine the issue condition.

Then, the issuing unit 12 determines whether the format of the received packet has been changed (Step S203). If the format of the packet has been changed, i.e., if the log collection area has been set in the packet, the issuing unit 12 issues the packet without processing anything (Step S206), sends the packet to the embedding unit 13, and completes the process.

In contrast, if the format of the packet has not been changed (No at Step S203), the issuing unit 12, then determines whether the input packet agrees with the issue condition of the log collection packet (Step S204). In the first embodiment, the issuing unit 12 determines whether the address extracted at Step S202 corresponds to a predetermined address that is set in advance. Then, if the packet that is input at Step S201 does not agree with the issue condition (No at Step S204), the issuing unit 12 issues the packet without processing anything (Step S206), sends the packet to the embedding unit 13, and completes the process.

In contrast, if the packet agrees with the issue condition (Yes at Step S204), the issuing unit 12 changes the format of the packet (Step S205). Specifically, the issuing unit 12 creates, in the packet, the log collection area for collecting logs of the packet.

Then, the issuing unit 12 issues the log collection packet (Step S206), sends the issued packet to the embedding unit 13, and then completes the process.

Flow of a Process Performed by the Embedding Unit

In the following, the flow of a process performed by the embedding unit will be described with reference to FIG. 8. In the first embodiment, the embedding unit 13, the embedding unit 15, the embedding unit 22, the embedding unit 23, and the embedding unit 24 are used as the embedding units. All of the embedding units perform the same process; therefore, in the following, the flow of the process performed by the embedding unit 13 will be described.

The embedding unit 13 determines whether an input of the packet has been received. If an input of the packet has not been received (No at Step S301), the embedding unit 13 waits for the input of the packet.

In contrast, if an input of the packet has been received (Yes at Step S301), the embedding unit 13 extracts information from the packet (S302). Specifically, the embedding unit 13 extracts, from the packet, information that is used to determine, at Step S303 that will be described later, whether a log can be embedded. At Step S302, for example, the embedding unit 13 checks whether a log collection area is created.

Then, the embedding unit 13 determines whether the log can be embedded in the received packet (Step S303). For example, the embedding unit 13 determines whether a log collection area is created in the packet. If the log cannot be embedded in the received packet (No at Step S303), the embedding unit 13 transfers the packet without processing anything (Step S306) and completes the process.

In contrast, if the log can be embedded in the received packet (Yes at Step S303), the embedding unit 13 determines whether it is an appropriate time to embed the log (Step S304). If it is the embedding timing (Yes at Step S304), the embedding unit 13 embeds the log in the packet (S305). For example, the embedding unit 13 embeds, in the log collection area, the input port information and the chip information.

Thereafter, the embedding unit 13 transfers the packet (Step S306) and completes the process.

Flow of a Process Performed by the Storing Unit

In the following, the flow of a process performed by the storing unit 25 will be described with reference to FIG. 9. As illustrated in FIG. 9, first, the storing unit 25 determines whether an input of the packet has been received (Step S401). If an input of the packet has not been received (No at Step S401), the storing unit 25 waits for the input of the packet.

In contrast, if an input of the packet has been received (Yes at Step S401), the storing unit 25 determines whether the destination of the packet is a crossbar switch (S402). If the destination of the packet is a crossbar switch (Yes at Step S402), the storing unit 25 outputs the packet without processing anything (Step S404) and completes the process.

In contrast, if the destination of the packet is not a crossbar switch (No at Step S402), the storing unit 25 stores, in a history, the logs embedded in the log collection area and discards the log collection area from the log collection packet (Step S403).

Then, the storing unit 25 outputs the packet (Step S404) and completes the process.

ADVANTAGE OF FIRST EMBODIMENT

As described above, according to the first embodiment, if each chip arranged in each crossbar switch receives an input of the packet, each chip creates and issues the log collection packet for collecting logs in the packet. Each chip collects logs related to transferring the input packet. Each chip embeds the collected logs in the issued log collection packet or in a log collection packet that is transferred from a crossbar switch in the previous stage. Furthermore, if the transfer destination of the packet is other than a crossbar switch, each chip stores, in the storage space, the logs embedded in the log collection packet and then transfers, to the transfer destination, the original packet in which the logs are deleted. If the transfer destination is a crossbar switch, each chip transfers the log collection packet to the crossbar switch in the next stage. Accordingly, it is possible to easily collect and analyze, in a reliable manner, the performance of the packet that is transferred between the multistage crossbar switches.

Specifically, with the conventional technology, because logs are collected for each chip, the logs cannot be anything but fragmented. Accordingly, for example, even when debugging is performed by focusing on a specific packet, it is difficult to analyze which path is used by that packet when it passes each chip in each crossbar switch or analyzes the state of that packet when it passes the chip. Furthermore, in a large scale system that includes multistage crossbar switches, it is significantly difficult to analyze which path is used by that packet or analyze the state of the packet when it passes.

In contrast, with the technology described in the first embodiment, the log collection packet follows the packet itself that is used for the log collection and collects logs in an accumulative manner in real time in each chip in a crossbar switch through which the log collection packet passes. Accordingly, simply by analyzing logs collected by the log collection packet, it is possible to easily analyze which path is used by the packet when it passes each chip in each crossbar switch or analyze the state of the packet when it passes the chip. Furthermore, in a large scale system that includes multistage crossbar switches, it is possible to easily analyze which path is used by the packet or the state of the packet when it passes.

Furthermore, by focusing on the behavior of the packet, it is possible to collect logs, such as the latency time, the arbitration time, the busy rate, and paths, of each crossbar switch from the beginning of the path to the end of the path. Accordingly, it is possible to analyze validity and performance evaluation of the entire system.

Furthermore, in a similar manner as with the packet, the log collection packet is stored in a queue, is involved in arbitration, and is output. Therefore, it is possible to collect data equal to an actual measurement value. In other words, it is possible to collect information, such as latency information, mediation time information, or status information, related to a circuit between the crossbar switches. Furthermore, it is also possible to analyze path information or latency information on a system that uses multistage crossbar switches with two stages or more.

[b] Another Embodiment

The embodiment of the present invention has been described; however, the present invention is not limited to the embodiment described above and can be implemented with various kinds of embodiments other than the embodiment described above.

Issue Timing

In the first embodiment described above, a chip of a crossbar switch receives, from the system management that is a higher level device, an issue instruction, such as the commencement instruction for a log collection process, and then determines whether the issue instruction agrees with the issue condition that is set in advance. If the issue instruction agrees with the issue condition, the log collection packet is issued. However, the present invention is not limited thereto. For example, a chip in a crossbar switch can start a log collection process without receiving the issue instruction from the system management. In such a case, log collection packets for all of the packets can be issued or, for example, a log collection packet can be issued only when the status condition that is set in advance is satisfied, such as the busy rate exceeding a predetermined threshold. In other words, the timing of issuing the log collection packet can be arbitrarily changed in accordance with the operation.

Embedded Information

In the first embodiment described above, possible logs embedded in the log collection packet include the chip information, the input port information, the output port information, the arbitration time information, the busy rate information, and the latency information; however the present invention is not limited thereto. Other information can be embedded as long as it is information that can be embedded in a chip and information that is to be collected as a log of a packet. In other words, the log embedded in the log collection packet can be arbitrarily changed in accordance with the operation.

System Configuration, Etc.

Of the processes described in the embodiments, the whole or a part of the processes that are mentioned as being automatically performed can be manually performed, or the whole or a part of the processes that are mentioned as being manually performed can be automatically performed using known methods. Furthermore, the flow of the processes (e.g., FIGS. 6 to 9), the control procedures, the specific names, and the information containing various kinds of data or parameters indicated in the above specification and drawings can be arbitrarily changed unless otherwise noted.

The components of each crossbar switch illustrated in the drawings are only for conceptually illustrating the functions thereof and are not necessarily physically configured as illustrated in the drawings. In other words, the specific shape of a separate or integrated crossbar switch is not limited to the drawings; however, all or part of the crossbar switch can be configured by functionally or physically separating or integrating any of the units, such as integrating multiple embedding units, depending on various loads or use conditions. Furthermore, all or any part of the processing functions performed by each crossbar switch can be implemented by a CPU and by programs analyzed and executed by the CPU or implemented as hardware by wired logic.

If the processing functions are implemented by a program, the program causes a computer to execute, in the CPU, an issuing process for issuing, when a packet is received by being input from any of units in the computer, a history collection packet that is used to collect historical information on the packet; an embedding process for embedding, in the history collection packet that is issued by the issuing process or in a history collection packet that is transferred from a crossbar switch in a previous stage, historical information that is to be collected by the history collection packet; and a transferring process for transferring, if a transfer destination of the history collection packet in which the historical information is embedded by the embedding process is other than a crossbar switch, to the transfer destination, only the original packet for collecting the historical information after storing the historical information embedded in the history collection packet in a storage space and transferring, if the transfer destination is a crossbar switch, to a crossbar switch in a next stage, the history collection packet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A crossbar switch system comprising crossbar switches, arranged in multiple stages, that form paths that connect each unit in a computer, each of the crossbar switches including
an issuing unit that creates and issues, when a packet is input, a history collection packet that is used to collect historical information on the packet;
a collecting unit that collects historical information related to transferring the input packet;
an embedding unit that embeds, in the history collection packet that is issued by the issuing unit or in a history collection packet that is transferred from a crossbar switch in a previous stage, the historical information collected by the collecting unit;
a storage space that stores therein historical information; and
a transferring unit that transfers, if a transfer destination of a packet is other than the crossbar switches, to the transfer destination, only an original packet in which the historical information is deleted after storing in the storage space the historical information that is embedded in the history collection packet and that transfers, if the transfer destination is a crossbar switch, to a crossbar switch in a next stage, the history collection packet.

2. The crossbar switch system according to claim 1, wherein the issuing unit changes a format of the input packet, creates a historical information collection area that collects, in the packet, historical information, and issues the history collection packet.

3. The crossbar switch system according to claim 1, wherein the embedding unit embeds, as the historical information, at least one piece of information selected from among chip information that identifies a chip, port information that identifies a port that is used when the packet passes the crossbar switch, mediation time information that indicates mediation time when the packet passes the crossbar switch, status information that indicates a status of a resource of the crossbar switch, and passing time information that indicates passing time when the packet passes the crossbar switch.

4. The crossbar switch system according to claim 1, wherein the issuing unit starts an issuing caused by at least one of an instruction sent from an external device that is connected to a crossbar switch and a status inside a chip agreeing with a condition, which is set in advance, for the status inside the chip.

5. A crossbar apparatus that are connected to a plurality of devices and that are arranged for a data transfer between the devices, the crossbar apparatus comprising:
- an issuing unit that issues a history collection packet in which an area for recording historical information on a packet transfer is added to a packet that is input;
- a collecting unit that collects historical information on a packet transfer;
- a writing unit that writes, in the issued history collection packet or a history collection packet that is received from another device, the historical information collected by the collecting unit;
- a storage space that stores therein historical information; and
- a transferring unit that transfers, if a transfer destination of a packet is a device other than the crossbar apparatus, to the transfer destination, only a packet in which an area for recording the historical information is deleted after storing in the storage space the historical information that is embedded in the history collection packet, whereas transferring unit transfers, if the transfer destination of the packet is a crossbar apparatus, a history collection packet to which historical information collected by the crossbar apparatus is written to a crossbar apparatus in a next stage.

\* \* \* \* \*